(12) United States Patent
Umeda et al.

(10) Patent No.: US 6,606,458 B2
(45) Date of Patent: Aug. 12, 2003

(54) AUTOMATIC FRAMING CAMERA

(75) Inventors: Yoshihito Umeda, Yamanashi-ken (JP);
Motoki Kasai, Yamanashi-ken (JP);
Kenji Masuyama, Koufu (JP)

(73) Assignee: Nisca Corporation, Yamanashi-ken (JP)

( * ) Notice: Subject to any disclaimer, the term of this patent is extended or adjusted under 35 U.S.C. 154(b) by 0 days.

(21) Appl. No.: 10/230,326

(22) Filed: Aug. 29, 2002

(65) Prior Publication Data

US 2003/0049027 A1 Mar. 13, 2003

(51) Int. Cl.[7] .................... G03B 15/00; H04N 7/18; H04N 5/232
(52) U.S. Cl. .................. 396/110; 396/116; 396/123; 396/428; 348/143; 348/169
(58) Field of Search ................. 396/106, 89, 110, 396/116, 121–123, 419, 428, 427; 348/169–172, 156, 143

(56) References Cited

U.S. PATENT DOCUMENTS

| | | | | |
|---|---|---|---|---|
| 3,442,193 A | * | 5/1969 | Pagel .......................... | 396/110 |
| 5,223,875 A | * | 6/1993 | Yangisawa ................... | 396/419 |
| 5,249,013 A | * | 9/1993 | Demura et al. ............. | 396/116 |
| 5,270,765 A | * | 12/1993 | Kunishige ................... | 396/123 |
| 5,389,967 A | * | 2/1995 | Kim ............................ | 348/169 |
| 5,864,363 A | * | 1/1999 | Giefing et al. .............. | 348/143 |
| 6,476,859 B1 | * | 11/2002 | Galloway et al. ....... | 348/143 X |

OTHER PUBLICATIONS

Patent Abstract of Japan, No. 09–289609, publication date Nov. 4, 1997, Applicant Aiphone Co., Ltd.
Patent Abstract of Japan, No. 2001–043381, publication date Feb. 16, 2001, Applicant Toshiba Corp.

* cited by examiner

*Primary Examiner*—W. B. Perkey
(74) *Attorney, Agent, or Firm*—Kanesaka & Takeuchi

(57) ABSTRACT

This invention provides an automatic framing camera that identifies a still subject, frames it, and photographs it.

The ranging direction of a ranging unit (light emitting element and light receiving element) that can range in one direction is changed by a pan motor and a tilt motor, and a still person is searched for by changes in the signal from the ranging unit. Then, the photography direction of the imaging element is turned by the tilt motor toward the center of the face of the person that was found, this is framed with the center of the person's face in the center of the angle of view, and the person's face is photographed by the imagining component.

16 Claims, 14 Drawing Sheets

(A)
*Fig.7*
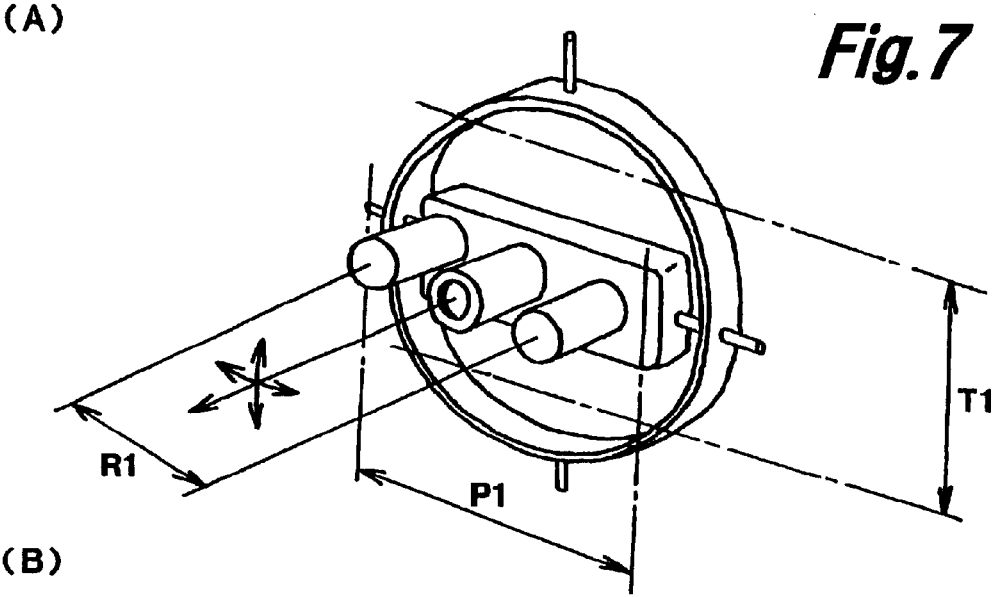
(B)
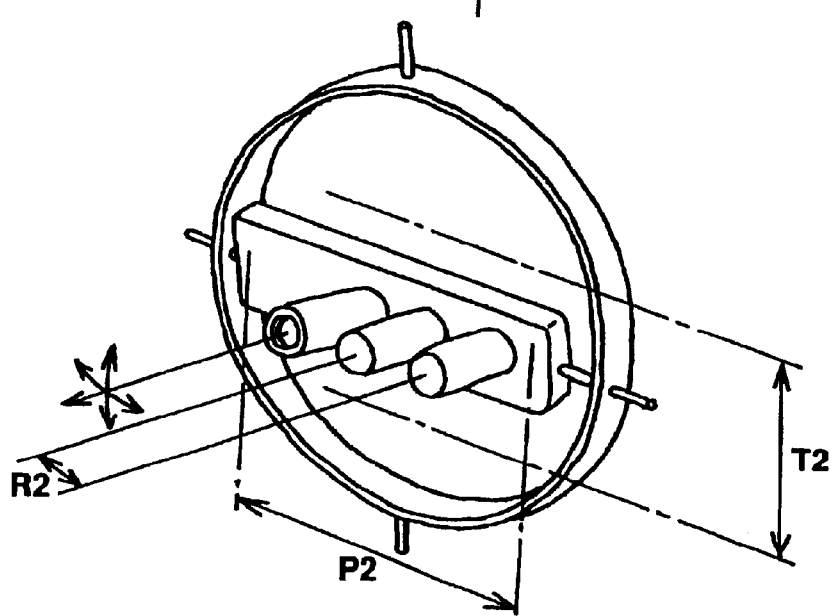
(C)
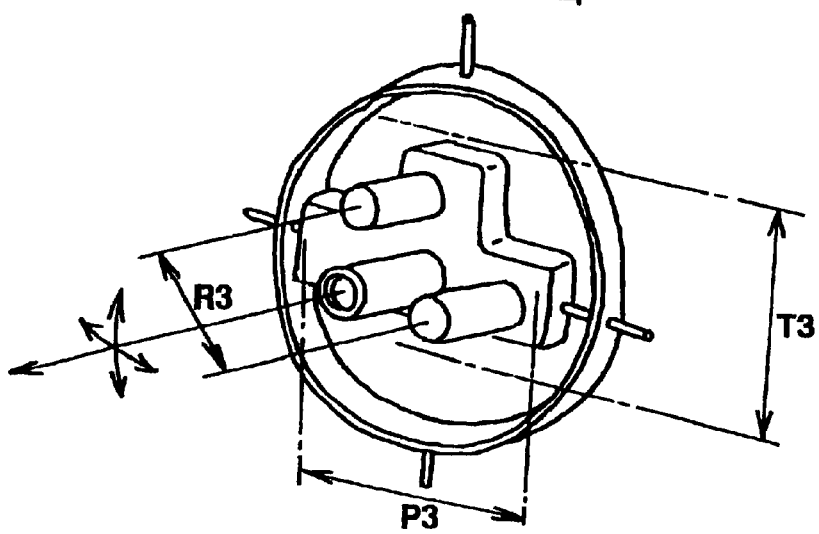

Fig. 8
(A)
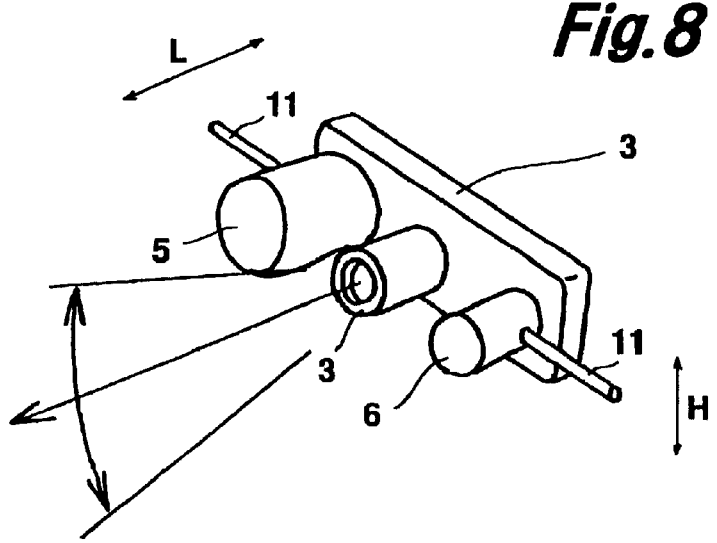
(B)
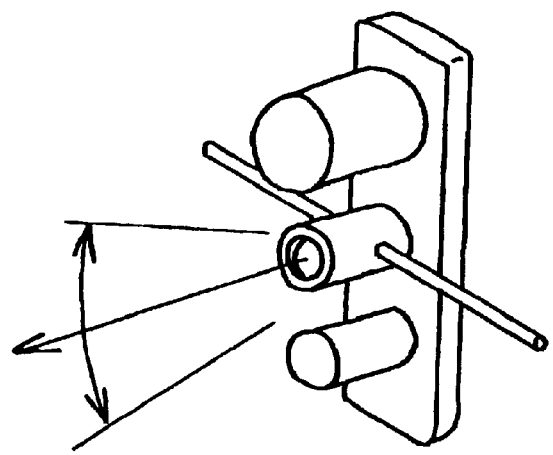
(C)
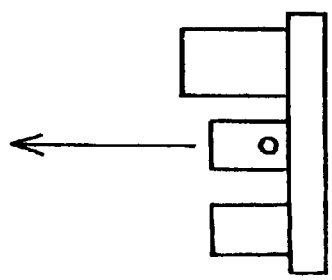
(D)
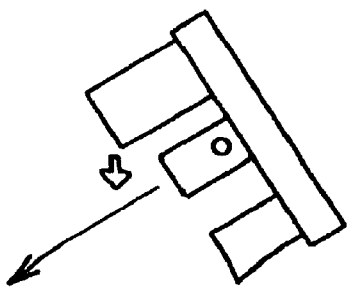

AUTOMATIC FRAMING CAMERA

BACKGROUND OF THE INVENTION

1. Technical Field

The present invention relates to an automatic framing camera comprising a framing means for detecting the position of a still subject, and of automatically framing this within a photographic range.

2. Prior Art

In recent years, progress has been made in development of systems such as verification systems that photograph a person's face and convert this to an electronic image, automatically identify that person from this image information, and verify the person as the actual person making an application, and in development of recognition systems that automatically recognize special features of an object. With these systems, if there is a large volume of information for the image information required for verification or recognition, it is possible to prevent an erroneous judgment, so it is necessary to have an image that frames a full photographic image of a person's face or the special features of an object. To do this framing automatically, it is necessary to aim the photographing direction of the camera toward the person or object, and to take the photograph so as to capture the face of the person or the special features of the object.

As a method for doing this, for example, disclosed in Tokkaihei 2001-43381 is a technology that continuously inputs images containing people and generates differential images between multiple images continuously over time, sets an outline using the position of a person's shoulders and top of the head as a standard, and extracts the human area such as the face. With this technology, an outline is extracted for the difference before the image is moved and after the image is moved, and the photographing direction of the camera can be moved toward the person's face, etc.

Also, disclosed in Tokkaihei 9-289609 is a technology that turns a camera in the direction of sound issued from the subject. With this technology, it is possible to automatically turn a camera toward the direction of sound, so it is possible to photograph a person, etc. who is emitting a sound.

OBJECTIVE OF THE INVENTION

However, with the technology of Tokkaihei 2001-43381, it is necessary to perform image processing that extracts the human area at high speed while capturing the image, and a high speed image processing function is required, so this is not suitable for low cost systems. Also, depending on the performance of the image processing function, a good deal of time may be required until the human area is extracted. Also with this technology, the method is to obtain the difference before and after moving, so it is difficult to apply this to still subjects.

Also, with the technology of Tokkaihei 9-289609, use is difficult on subjects that do not emit sound and in places where there is noise, such as outdoors. Furthermore, this is not suitable for use as a means of accurately framing a person for photographing because of sound reflection problems and sound directivity accuracy problems using sound to detect detection.

The object of the present invention is to provide an automatic framing camera that solves the problems noted above while also identifying, automatically framing, and photographing a still subject.

SUMMARY OF THE INVENTION

The present invention is an automatic framing camera comprising a photographing means for photographing subjects, a ranging means that measures the distance in one direction, and a direction changing means that changes as a single unit the photographing direction of the aforementioned photographing means and the ranging direction of the aforementioned ranging means, wherein [the camera] obtains in sequence the distance information corresponding to the direction for which the aforementioned ranging direction was changed by the aforementioned direction changing means, identifies a subject from changes in the aforementioned distance information, and turns the aforementioned photographing direction using the aforementioned direction changing means toward the aforementioned identified subject and takes a photograph.

According to the above, a still subject has its ranging direction changed by a direction changing means and is identified from changes in the ranging information by the ranging means, and the photographing direction of the photographing means is turned toward the subject by the direction changing means and the subject is photographed, so it is possible to obtain an image of a still subject while also having the subject framed in the obtained image, and because image processing such as cutting out images for framing is not necessary, it is possible to make the system higher speed and lower cost.

BRIEF DESCRIPTION OF THE FIGURES

FIG. 7 is a perspective view of the external appearance showing a typical example of the distance between the light emitting and light receiving elements and the space required for pan tilt, where (A) is an embodiment, (B) is comparative example 1, and (C) is comparative example 2.

FIG. 8 shows a typical example of the ranging unit of the embodiment, where (A) is an oblique diagram of the external appearance of the embodiment, (B) is an oblique diagram of the external appearance of comparative example 3, (C) is a side view of comparative example 3 in a vertical stance, and (D) is a side view of comparative example 3 during tilt.

DESCRIPTION OF THE PREFERRED EMBODIMENT

Below is an of embodiment for which the present invention is applied to an automatic framing camera that automatically frames the face of a person in reference to drawings provided.

Configuration

Figure 1:
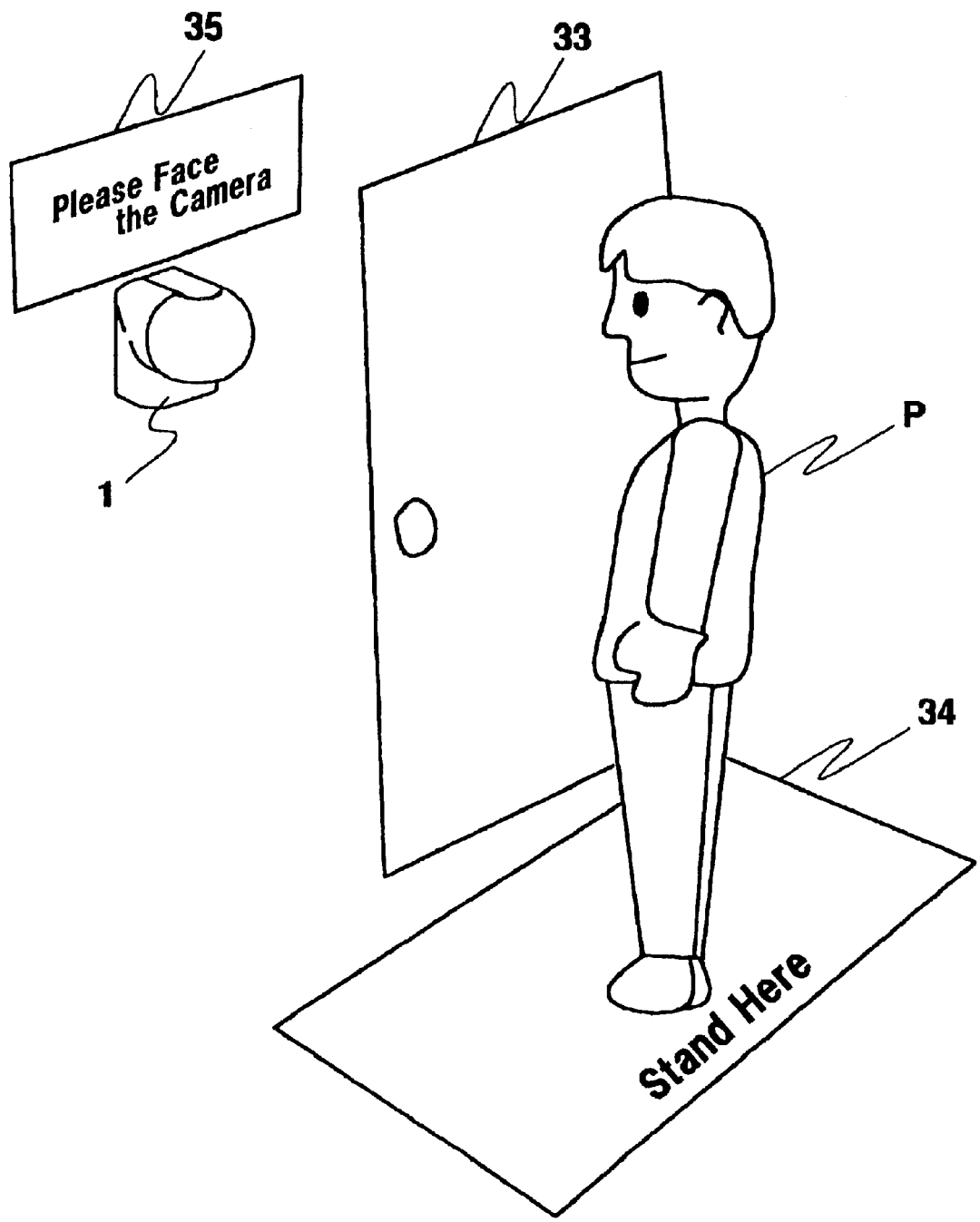
FIG. 1 is a perspective view that shows a typical example of the placement of the automatic framing camera to which this invention can be applied.

As shown in FIG. 1, on a wall surface, not shown in the drawings, there is a door 33 through which a person can enter and exit. Near door 33 (at the left side) is placed automatic framing camera (hereafter abbreviated as camera) 1 that photographs the face of person P who stands in front of door 33. Above camera 1, sticker 35, which instructs person P to turn his face toward camera 1, is attached to the wall surface. Also, on the floor surface in front of door 33, a verification area 34 at which it is possible for camera 1 to photograph the face of person P is shown by a rectangle. In the floor surface of verification area 34 is embedded a pressure switch (see item 31 in FIG. 4) that allows detection of person P in verification area 34 by the person's weight. The image information of the face of person P photographed by camera 1 is sent to a host unit, not shown in the drawings such as a personal computer via an interface, not shown in the drawings. At the host unit, processing is performed on the image information of the face of person P to extract data such as the special features of the face of person P, and when this matches the special features of person P stored in the host unit database, then door 33 is unlocked.

Figure 2:
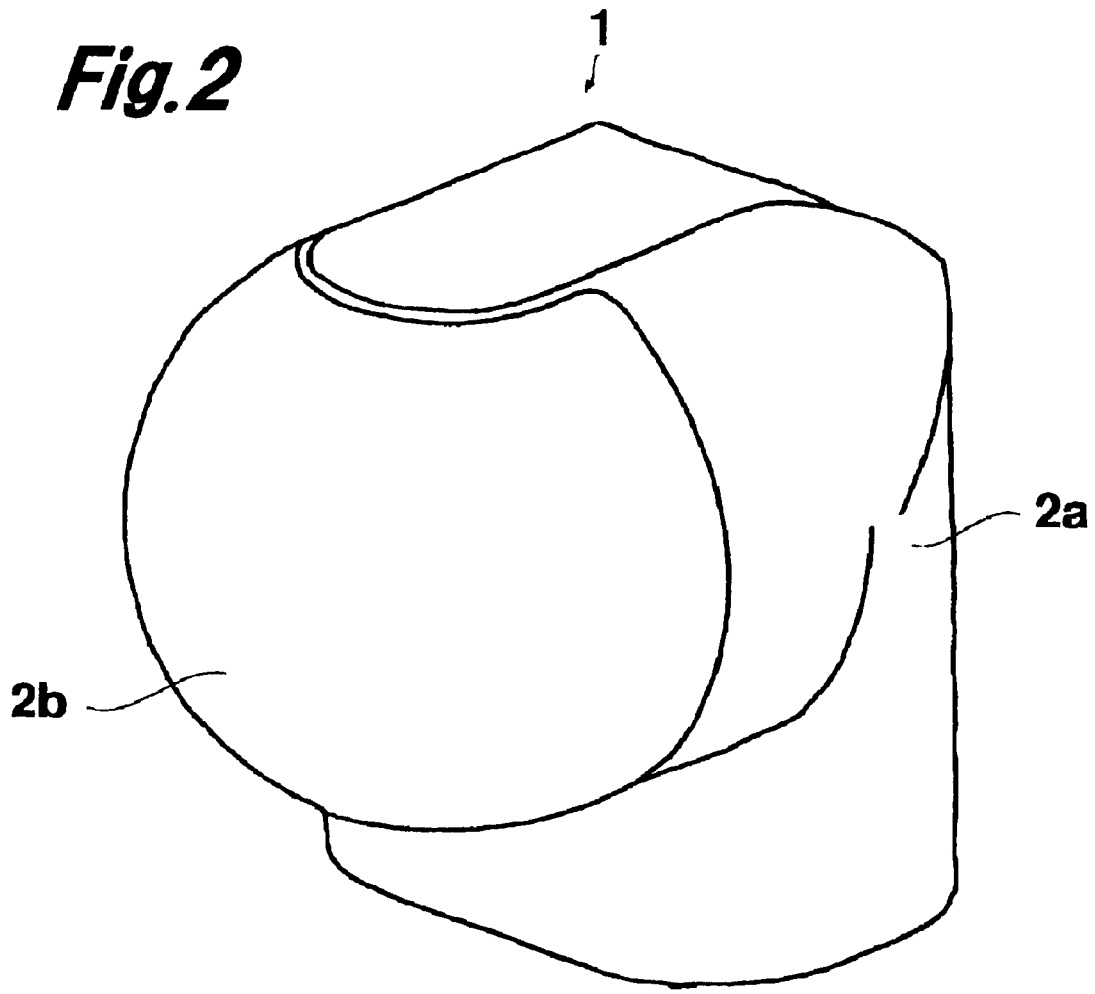
FIG. 2 is a perspective view of the external appearance of the automatic framing camera.

As shown in FIG. 2, camera 1 comprises a helmet type casing 2a that is described later, which covers the camera main unit, and a hemispherical hood 2b which covers the front opening of casing 2a. A material such as ABS resin can be used for casing 2a, and a transparent material such as PC resin can be used for hood 2b.

Figure 3:
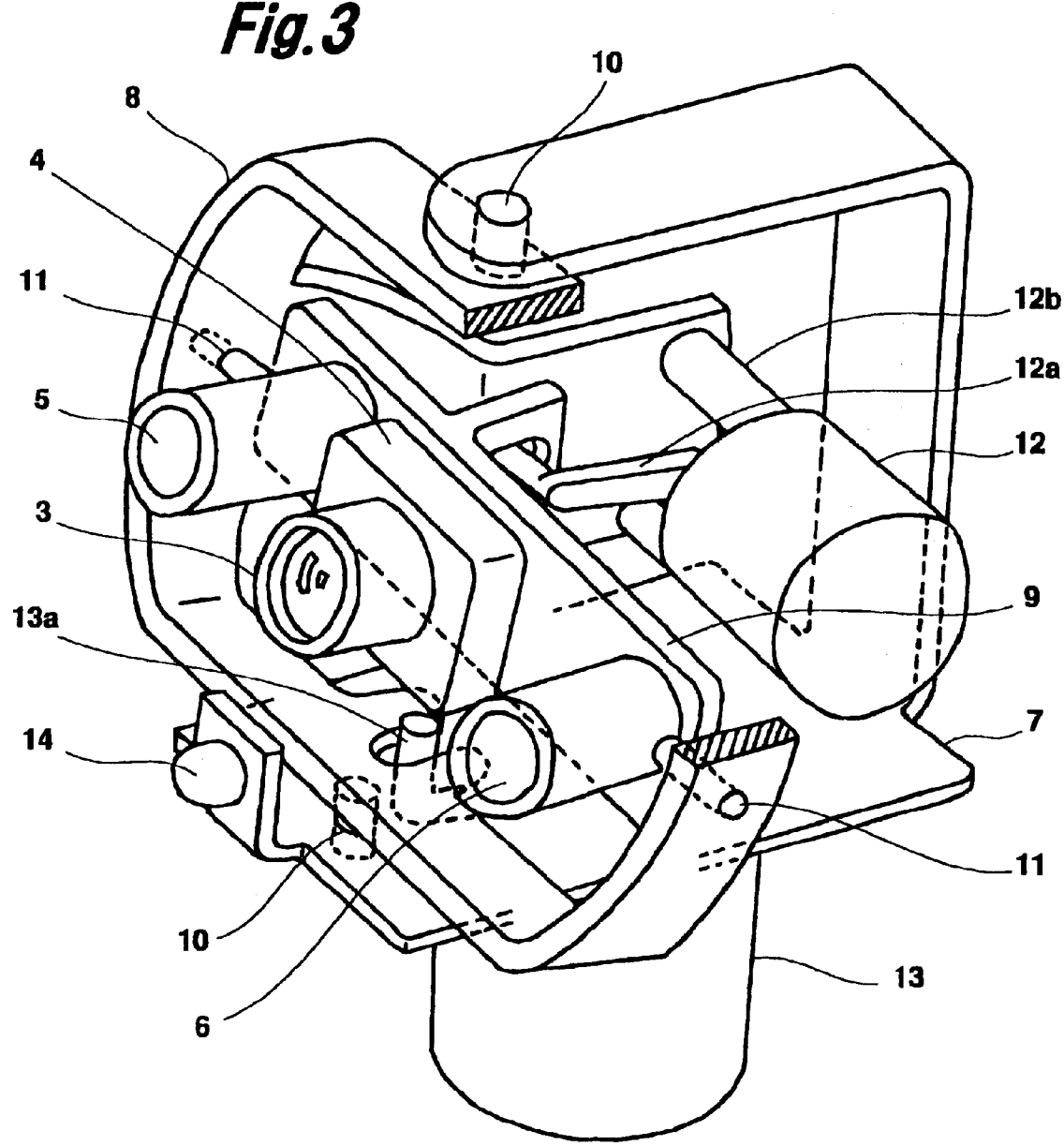
FIG. 3 is a perspective view of the external appearance of the schematic structure of the automatic framing camera.

As shown in FIG. 3, the camera main unit has a steel plate first frame 7 that supports the camera main unit and functions as a camera platform. The center part of first frame 7 is a rectangular steel plate, and has a projection that is bent at the top at the center of the front side (of the camera main unit). On the front of this projection is fixed an infrared LED 14 that emits (projects) infrared light. Meanwhile, an L-shaped cross-section support unit emerges from the top of the center part of the opposite side (back side) of the projection of first frame 7.

Near the projection at the center of first frame 7 and at the front side of the L-shaped cross-section support unit are provided respectively in a vertical direction a second frame 8 made of resin that is supported on a pan direction support axis 10 with the ability to rotate in the pan direction (horizontal direction), and the center part of the first frame and the L-shaped cross-section support unit act as a bearing for pan direction support axis 10. When seen from the front, second frame 8 is shaped substantially like a quadrangle with a notched top and bottom.

Plate shaped third frame 9 made of resin is placed inside second frame 8. Photographic lens 3 for photographing the face of person P is placed in the center of the front of third frame 9, and an imaging element 4 such as a CCD that outputs image information is fixed at the focal point position of the photographic lens. A fixed focal point lens excluding the IR (infrared light) filter normally placed in an optical system is used for the photographic lens 3.

Also, at the front of third frame 9, on both sides of the photographic lens are fixed a pillar shaped light emitting element 5 that emits an approximately 3 mm infrared spotlight and a pillar shaped light receiving element 6 that receives the reflected infrared light from light emitting element 5. Light emitting element 5, photographic lens 3, and light receiving element 6 are arranged in a substantially horizontal straight line, and are provided facing in the same direction. Light emitting element 5 and light receiving element 6 form an infrared light active method ranging unit, and the range-able distance of the ranging unit is approximately 5 m.

Tilt direction support axes 11 that support the third frame to be able to rotate in the tilt direction in relation to the second frame are each provided in a substantially horizontal direction on the opposite side from the photographic element 4 side from the pillar shaped outer periphery side of the light emitting element 5 and light receiving element 6. These two tilt direction support axes 11 are on the same axial line, and are supported on the second frame. The positions of tilt direction support axes 11 are positions that are the center of gravity position in relation to all components fixed to the third frame.

A form with approximately the same thickness as third frame 9 is extended in the back surface direction of the camera main unit from a position slightly toward the light emitting element 5 from the center on the back side of third frame 9. A slot is formed at the center of this form. Also, on the back side of the third frame 9 is mounted a control substrate of the CCD operation control circuit that controls operation of the imaging element 4 and the control circuit (see item 20 in FIG. 4) that controls the camera main unit to be described later. Note that a lead wire comes out from the control substrate, and this is connected to a connector, not shown in the drawings, that is placed on the back side of casing 2a to ensure connection with the host unit described previously.

The motor fixing unit comes out extending toward the back surface from one side (the light emitting element 5 side) of second frame 8. At the tip of the motor fixing unit, stepping motor (hereafter called a tilt motor) for tilt driving third frame 9 is fixed by screws via two columns 12b that come out from tilt motor 12. A substantially L-shaped drive lever 12a is fixed by press-fitting on the motor axis of tilt motor 12. The tip of the drive lever 12a is inserted into the slot of the plate of third frame 9.

Meanwhile, on the back surface (bottom surface) of the center part of first frame 7, stepping motor (hereafter called a pan motor) 13 for pan driving second frame 9 is fixed by a screw via two columns (not illustrated) which come out from pan motor 13. A substantially L-shaped drive lever 13a is fixed by press-fitting to the motor axis of pan motor 13. The tip of drive lever 13a is inserted into a U-shaped notch formed at the base position of the center of second frame 8.

Therefore, third frame 9 is supported to be able to rotate in the tilt direction in relation to second frame 8 by tilt direction support axis 11, and second frame 8 is supported to be able to rotate in relation to first frame 7 by pan direction support axis 10, so light emitting element 5, photographic lens 3, and light receiving element 6 which are fixed to third frame 9 have a structure whereby their direction can be changed as a single unit in both horizontal and vertical directions by the driving of pan motor 13 and tilt motor 12. For tilt motor 12 and pan motor 13, it is also possible to use in place of the stepping motors of this example a meter with a rotation position sensor that rotates drive levers 12a and 13a at an angle of less than a half turn (180°).

Figure 4:
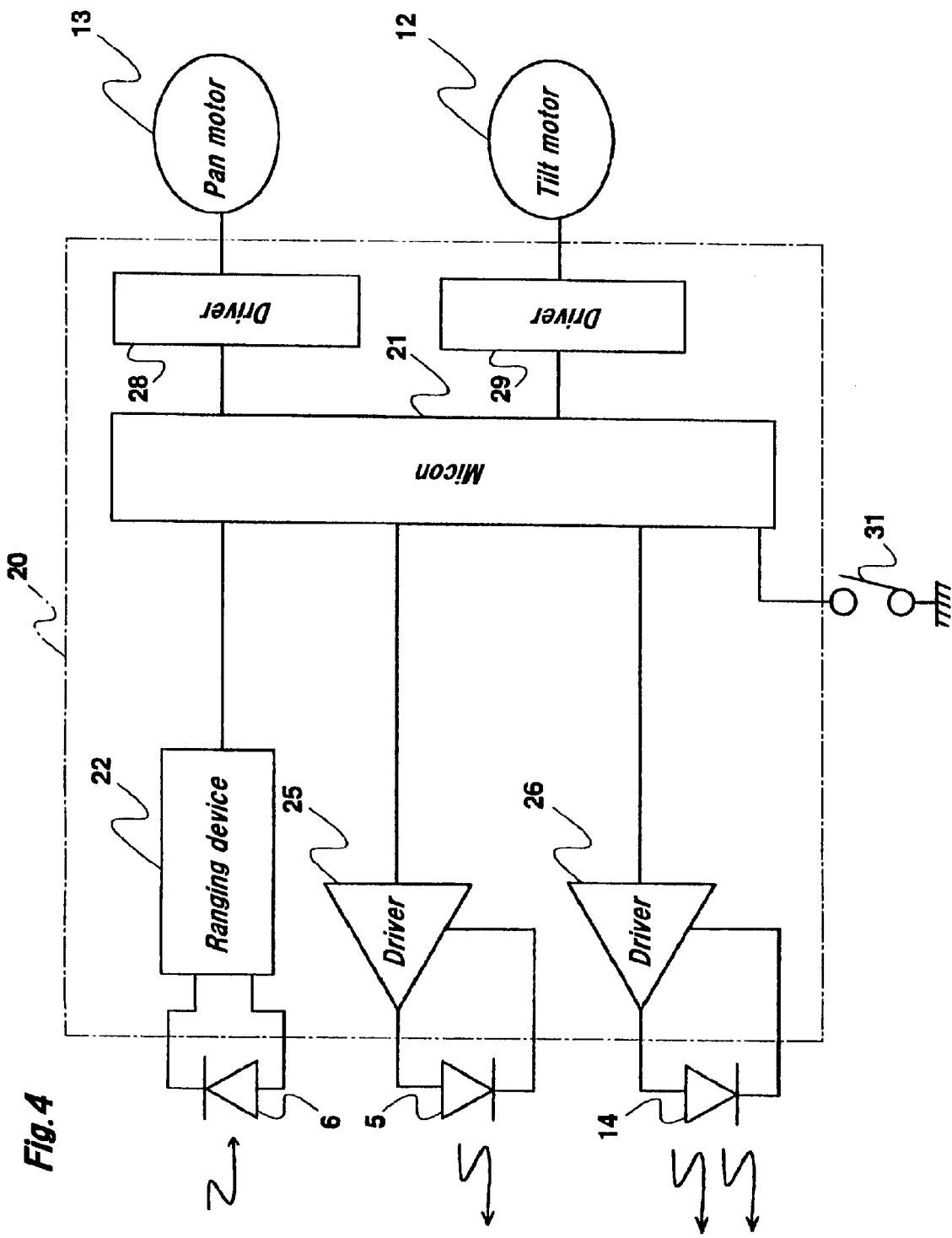
FIG. 4 is a block diagram that shows the schematic structure of the control circuit of the automatic framing camera.

As shown in FIG. 4, the camera main unit has a control circuit 20 that controls the drive of tilt motor 12 and pan motor 13 as well as the infrared light emission and light reception of light emitting element 5, light receiving element 6, and light emitting LED 14. Control circuit 20 is composed from a microcomputer (hereafter referred to as micon) 21 that incorporates a CPU, RAM, ROM, and interface, a driver 25 that makes light emitting element 5 emit light based on an H (high) level signal from micon 21, a ranging device 22 that has an arithmetic circuit and ranges the distance to the subject by doing a photoelectric conversion of the infrared reflected light received by light receiving element 6, a driver 26 that makes infrared LED 14 emit light based on an H (high) level signal from micon 21, and drivers 28 and 29 that drive in both forward and reverse rotation directions the tilt motor 12 and pan motor 13. Micon 21 is connected to ranging device 22, and ranging device 22 is connected to light receiving element 6. Micon 21 is also connected to drivers 25 and 26, and drivers 25 and 26 are respectively connected to light emitting element 5 and light emitting LED 14. Furthermore, micon 21 is connected to drivers 28 and 29, and driver 28 is connected to pan motor 13 while driver 29 is connected to tilt motor 12. Note that micon 21 is also connected to the pressure switch 31 described above.

Operation

Next, while referring to flow charts, we will explain the operation of camera 1 of this embodiment. Note that micon 21 should be in a state whereby it has already finished initial processing on ROM and RAM, and it can execute a framing routine for turning the photographing element 4 of the camera main unit toward the face of person P and then performing framing and imaging.

Figure 5:
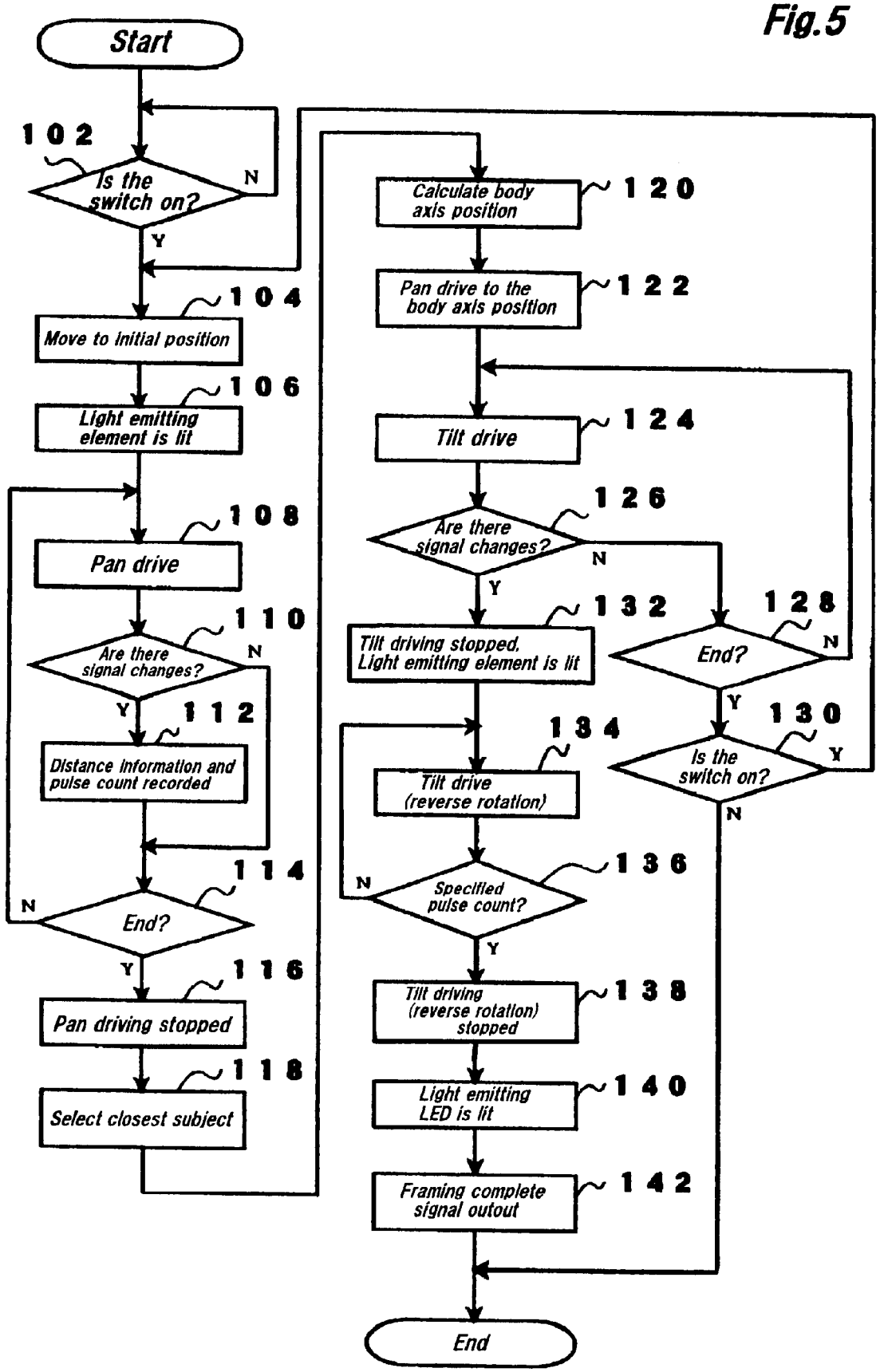
FIG. 5 is a flow chart of the framing routine executed by the micro-computer of the control circuit of the automatic framing camera.

As shown in FIG. 5, with this framing routine, first, at step 102, the system waits until pressure switch 31 is on. When pressure switch 31 is on, at the next step 104, pan motor 13 and tilt motor 12 are driven by drivers 28 and 29, the camera main unit (including the ranging unit) is moved to face the direction of the initial position of the ranging direction, and driving of pan motor 13 and tilt motor 12 is stopped.

Figure 6:
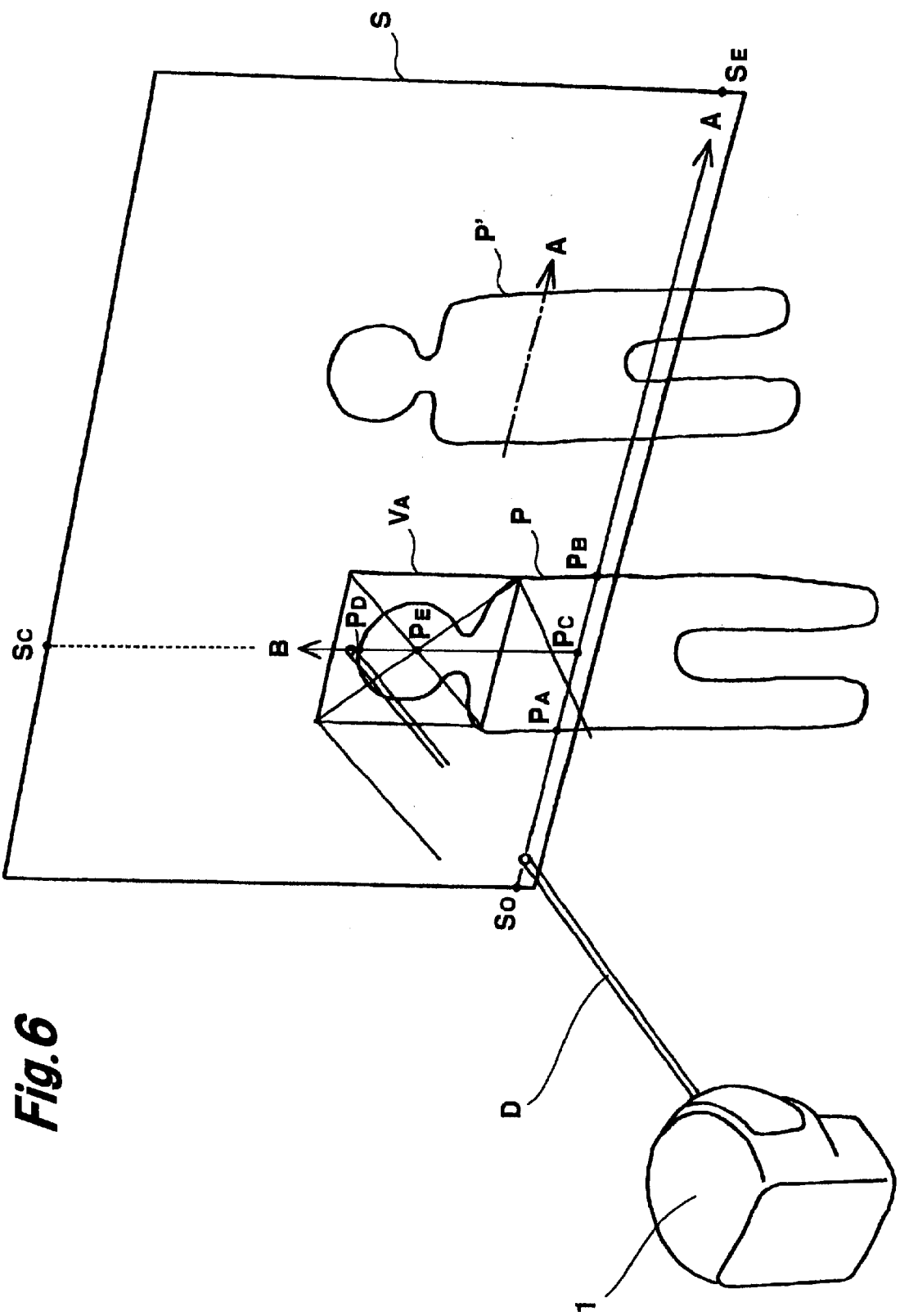
FIG. 6 is an explanatory diagram that shows a typical example of the automatic framing camera ranging direction and ranging tolerance.

As shown in FIG. 6, the rangeable direction D of the ranging unit is within the direction of ranging tolerance S for the pan direction and tilt direction. Ranging tolerance S is determined by the drive range of pan motor 13 and tilt motor 12. Note that the ranging tolerance S shown in FIG. 6 shows a typical example of the ranging scope of the ranging unit for the position of person P. Initial position (initial direction) $S_D$ is the position of the pan direction edge at the bottom edge of the tilt direction of this ranging tolerance S. The bottom edge of the tilt direction of ranging tolerance S is the position above the floor for the boundary of the distance for which ranging is possible for the ranging unit, in other words, the rangeable distance is set so as to be shorter than the distance to the floor. Initial position $S_D$ is set at a position for which person P (or person P') does not exist in the horizontal direction within ranging tolerance S, and is set at a position for which person P (or person P') does exist in the vertical direction (see figures including FIG. 1).

At step 106, an H level signal is output to driver 25 and light emitting element 5 is lit. By doing this, light receiving element 6 goes to a state capable of receiving the infrared light reflected by person P (or person P').

The lighting of light emitting element 5 can be pulse light emission or continuous light emission. With pulse light emission, the detection resolution becomes greater as the light emission interval becomes smaller, but because the energy consumption becomes great, this can be set according to the level of resolution that is necessary.

Next, at step 108, pan motor 13 is driven by driver 28, and ranging direction D is moved in the pan direction (the direction of arrow A in FIG. 6). By doing this, ranging direction D is moved from initial position $S_D$ to pan direction end position $S_E$ with the tilt direction left in its original position. Pan direction end position $S_E$ is set to a position where there is no person P on the opposite side of initial position $S_D$ which sandwiches the verification area 34.

Next, at step 110, a judgment is made of whether there is a change in the signal received by light receiving element 6, in other words, whether one side $P_A$ or the other edge $P_B$ of person P was captured. Ranging device 22 ranges the distance to the subject using the voltage from the light receiving element, and as shown in FIG. 6, the ranging information (distance information) for each ranging direction D during the pan operation including one side $P_A$ of person P, other edge $P_B$ of person P, and edge (not illustrated) of person P' positioned at a further distance than person P is output to micon 21. Because of this, micon 21 can judge the position that captures the subject, in other words, one side $P_A$ and other edge $P_B$ of person P.

When the judgment is negative at step 110, the system advances to step 114, and when it is affirmative, at the next step 112, up until there is a change in the signal from the initial position $S_D$ (one edge $P_A$ and other edge $P_B$ of person P), the pulse count value output to pan motor 13 by driver 28 and the ranging information from ranging device 22 for this are stored in RAM.

Next, at step 114, a judgment of whether ranging direction D reached pan direction end position $S_E$ is made based on whether or not the pulse count output to pan motor 13 by driver 28 was the predetermined pulse count. When the judgment is negative, the system returns to step 108 and continues pan driving pan motor 13, and when the judgment is affirmative, at the next step 116, driving of pan motor 13 is stopped. Next, at step 118, the distance information stored at step 112 is read, and the subject (person P) closest to camera 1 is selected.

Next, at step 120, the pulse count value from one side $P_A$ and other edge $P_B$ of person P which was recorded at step 112 is read, the midpoint pulse count value of these {(pulse count up to $P_A$+ pulse count up to $P_B$)/2} is calculated, and the calculated pulse count position is used as the axis position (body axis position) $P_C$ of the body of person P. The pulse count output to pan motor 13 by driver 28 from initial position $S_D$ to pan direction end position $S_E$ is constant, and the pulse count from initial position $S_D$ to body axis position $P_C$ is calculated, so by calculating the latter from the former, it is possible to calculate a pulse count for turning the ranging unit ranging direction D from pan direction end position $S_E$ to body axis position $P_C$. At step 122, pan motor 13 is reverse rotated for the pulse count calculated in this way so that ranging direction D is turned toward body axis position $P_C$, and the driving of pan motor 13 is stopped.

Therefore, the ranging unit is turned from the initial position $S_D$ through persons P and P' to the pan direction end position $S_E$ by forward rotation of pan motor 13 with the bottom edge of ranging tolerance S in a horizontal position, and once it has stopped at pan direction end position $S_E$, it is turned to body axis position $P_C$ by reverse rotation of pan motor 13.

At step 124, tilt motor 12 is driven by driver 29 to turn the ranging unit from body axis position $P_C$ upward (in the direction of arrow B in FIG. 6), and next at step 126, a judgment is made of whether there was a signal change. Specifically, as shown in FIG. 6, when the ranging unit is turned from body axis position $P_C$ upward, a signal change is obtained at person P's top of the head (top of the face) $P_D$, but at step 126, a judgment is made of whether ranging direction D went past top of the head $P_D$ by this signal change.

When the judgment at step 126 is negative, at step 128, a judgment is made of whether [ranging direction D] was driven to the body axis tilt direction end position $S_C$ which is the end edge (upper edge position) within ranging tolerance S for the body axis position $P_C$, and when the judgment at step 128 is negative, the system returns to step 124 to turn ranging direction D further upward. Note that the upper edge position of ranging tolerance S can be set considering the issue of not having any people taller than approximately 2.5 m or considering the installation position in the vertical (height) direction for camera 1. When the judgment at step 128 is affirmative, we can think of person P as having moved, so at the next step 130, a judgment is made of whether pressure switch 31 is on. When the judgment is affirmative at step 130, though a person P exists in verification area 34, person P has moved, so even if the framing routine is continued as is, an accurate framing of the face of person P will not be obtained, so the system again returns to step 104, and when the judgment is negative at step 130, a person P does not exist within verification area 34, so the framing routine ends.

Meanwhile, when the judgment is affirmative at step 126, the ranging direction D has passed top of the head $P_D$ of person P, so at step 132, while the tilt drive of tilt motor 12 is stopped, light emitting element 5 is also lit. Next, at step 134, tilt motor 12 is reverse rotated, and then at step 136, a judgment is made of whether the specified pulse count that was set in advance was output by driver 29 to tilt motor 12. When framing a person's face as done with camera 1 of this embodiment, when the top edge $P_D$ above body axis position $P_C$ is already known, the size of a person's face is substantially the same, so we can think of the position for example about 15 cm below from the top of the head $P_D$ as center of the face $P_E$ of person P. At step 136, to judge whether ranging direction D is facing the center of the face $P_E$ of person P, a judgment is made of whether a specified pulse count equivalent to this approximate 15 cm is output to tilt motor 12.

When the judgment is negative at step 136, the system returns to step 134 to continue the reverse rotation of tilt motor 12, and when the judgment is affirmative, at step 138, the reverse rotation of tilt motor 12 is stopped.

Therefore, from the body axis position $P_C$ of the lower edge of ranging tolerance S, the ranging unit turns in the vertical direction by forward rotation of tilt motor 12 through the top of the head $P_D$ of person P, and after stopping once, turns toward face center $P_E$ of person P by reverse rotation of tilt motor 12. Imaging element 4 is placed in a substantially horizontal straight line sandwiched by the ranging unit on third frame 9, and in the same direction, so the ranging unit faces face center $P_E$ of person P, so that as shown in FIG. 6, the face of person P is framed at an angle of view $V_A$ with the face center $P_E$ of person P as the center.

Next, at step 140, light emitting LED 14 is lit, and at the next step 142, a framing completion signal that notifies the host unit of framing completion is output, and the framing routine ends. By doing this, the host unit fetches the image from imaging element 4, and as described above, it performs image processing that extracts data such as the special features of the face of person P, and when these match the special features of person P stored in the host unit database, door 33 is unlocked.

Effects, etc.

Next, we will explain things such as the effect of camera 1 of this embodiment.

With camera 1 of this embodiment, the ranging direction D of the ranging unit (light emitting element 5 and light receiving element 6) that is capable of ranging in one direction by pan motor 13 and tilt motor 12 is changed (steps 108 to 116), and still person P is identified by changes in signals from the ranging unit by control circuit 20 (steps 118 to 122). Then, the photographing direction D of photographic lens 3 is turned by tilt motor 12 toward face center $P_E$ of the identified person P, face center $P_E$ of person P is framed in the center of angle of view $V_A$ (steps 124 to 138), and the face of person P is photographed by imaging element 4. Therefore, with camera 1 of this embodiment, it is possible to obtain an image of the face of still person P, so at the host unit, since it is not necessary to do trimming processing of cutting the face part of person P from the background, etc. as was required with the prior art, it is possible to shorten the image processing time and at the same time, to use a low pixel count, low cost camera because the high resolution conversion of imaging element 4 that occurs with trimming processing is not necessary. In other words, by using camera 1 of this embodiment, there is no need for trimming processing which focuses on the face of person P after fetching the image, and it is possible to obtain a post trimming process image at the point the image is fetched, so it is possible to shorten the processing time at the host unit and to lower the cost of the camera.

Also, almost all photographic subjects (persons P) are in the position closest to camera 1, so with this embodiment, even when there are multiple subjects including persons P and P', by photographing the face of person P who is the subject closest to camera 1 using imaging element 4, identification of the subject is simplified. Therefore, with this embodiment, we showed an example of operating micon 21 using software (a program), but it is also possible to form the control circuit using hardware that includes a comparator, etc. without using micon 21 or software, so it is possible to make the device lower in cost and smaller in size.

Furthermore, with camera 1 of this embodiment, an active method triangular ranging [device] is used. Because of this, by making light emitting element 5 emit light in the infrared range, it is possible to identify a subject such as a person P even in a dark place. Also, after identifying the center of the face of person P once, camera 1 of this embodiment makes infrared LED 14 emit light (step 140), and photographs the face of person P using imaging element 4, so there is no surprising the subject person P or damaging the vision of person P. Furthermore, with camera 1 of this embodiment, the structure is such that there is no IR cut filter in photographic lens 3, so imaging element 4 can photograph even in the infrared range. Specifically, a camera 1 for verification such as the one of this embodiment is typically placed in a relatively dark place such as a corridor or entryway, so the infrared range active method is used, light is projected on the subject by infrared LED 14, and by further using photographic lens 3 from which the IR cut filter has been removed, it is possible to exhibit the original functions of a verification camera which can take photographs even in dark places.

Even further, with camera 1 of this embodiment, a light emitting element 5 with a light spot diameter of about 3 mm was used. When the light spot diameter is too large, there are cases when it is difficult to distinguish the output from light receiving element 6, so that the outline, etc. of person P is unfocused. With camera 1 of this embodiment, we used a small diameter for which poor focus problems do not occur for the light spot of light emitting element 5, so it is possible to get an accurate grasp of the signal changes, and to frame the face of person P without error for photographing.

Next, we will explain in sequence the cameras of comparative examples for comparing things such as the effect of the structure of camera 1 of this embodiment, and the distance between light emitting element 4 and light receiving element 6, the space needed for pan drive and tilt drive, and the position of tilt direction support axes 11 provided at light emitting element 5 and light receiving element 6.

1. Distance Between the Light Emitting and Light Receiving Elements and Space Needed for Pan Tilt Embodiment With camera 1 of this embodiment, at both sides of third frame 9 and photographic lens 3 are arranged in a substantially horizontal straight line light emitting element 5 and light receiving element 6. Therefore, as shown in FIG. 7 (A), with camera 1 of this embodiment, the distance between light emitting element and light receiving element 6 is given as R1, the horizontal direction space (length) required for pan operation is given as P1, and the vertical direction space (length) required for tilt operation is given as T1. FIG. 7 shows a typical example of the vicinity of third frame 9 shown in FIG. 3.

COMPARATIVE EXAMPLE 1

As shown in FIG. 7 (B), with the camera of comparative example 1, photographic lens 3, light emitting element 5, and light receiving element 6 are placed on third frame 9 in a substantially horizontal straight line, and these are arranged in order from the left (of FIG. 7 (B)) of photographic lens 3, light emitting element 5, and light receiving element 6 (or photographic lens 3, light receiving element 6, and light emitting element 5). With this camera, the distance between light emitting element 5 and light receiving element 6 is given as R2, the horizontal direction space required for pan operation is given as P2, and the vertical direction space required for tilt operation is given as T2.

COMPARATIVE EXAMPLE 2

As shown in FIG. 7 (C), with the camera of comparative example 2, photographic lens 3 and light emitting element 5 (or light receiving element 6) are arranged in a substantially horizontal straight line on third frame 9, and light receiving element 6 (or light emitting element 5) and photographic lens 3 are arranged in a substantially vertical straight line. With this camera, the distance between light emitting element 5 and light receiving element 6 is given as R3, the horizontal direction space required for pan operation is given as P3, and the vertical direction space required for tilt operation is given as T3.

First, for this embodiment and the comparative examples, when distance R between the light emitting and light receiving elements is compared, as is clear from FIG. 7, distance R1 of this embodiment>distance R3 of comparative example 2>distance R2 of comparative example 1. With this embodiment, ranging is done using a trigonometric survey method, so the ranging precision is higher as the distance R between light emitting element 5 and light receiving element 6 is larger, making it possible to increase the precision of the framing of the face of person P.

Next, the horizontal space P required for pan operation result is that space P1 of this embodiment=space P3 of comparative example 2<space P2 of comparative example 1. The reason that space P2 of comparative example 2 becomes large is that photographic lens 3 must be placed in the center position of the pan tilt drive, in other words, at the intersection of the pan direction support axis 10 and tilt direction support axis 11, and when light emitting element 5 and light receiving element 6 are arranged on one side of photographic lens 3, an amount of space equivalent to this is needed on the other side of photographic lens 3, so space P2 becomes unavoidably longer. Meanwhile, as is clear from FIG. 7, vertical direction space T required for the tilt operation is space T1 of this embodiment=space T2 of comparative example 1<space T3 of comparative example 2. Therefore, camera 1 of this embodiment can have a smaller space required for pan tilt than the camera of the comparative examples, so the space efficiency of camera 1 is increased, making it possible to decrease the size.

Also, with camera 1 of this embodiment, photographic lens 3, light emitting element 5, and light receiving element 6 are arranged in a substantially horizontal straight line, so compared to the camera of comparative example 2 for which light emitting element 5 (or light receiving element 6) is placed above photographic lens 3, it is easier to achieve balance in the tilt direction, and compared to the camera of comparative example 1 for which light emitting element 5 and light receiving element 6 are placed on one side of photographic lens 3, it is easier to achieve balance in the pan direction.

2. Position of the Tilt Direction Support Axis That Is Provided Extending On the Light Emitting Element and Light Receiving Element Embodiment As described above, with camera 1 of this embodiment, tilt direction support axes 11 are provided on the same axis substantially horizontally, extending on the opposite side of imaging element 4 from the cylinder body outer periphery surface of light emitting element 5 and light receiving element 6. In fact, as shown in FIG. 8 (A), the axis position is arranged so as to extend from the center of gravity position in relation to all materials (including control circuit 20, etc.) fixed to third frame 9. Note that FIG. 8 shows a typical example of the vicinity of third frame 9 shown in FIG. 3, and that since light emitting element 5 and light receiving element 6 do not have the same weight, light emitting element 5 is shown larger to make it easier to see this weight difference.

COMPARATIVE EXAMPLE 3

As shown in FIG. 8 (B), with the camera of comparative example 3, on photographic lens 3 as well as at both sides of the lens, light emitting element 5 and light receiving element 6 are arranged in a straight line on third frame 9, the direction of this is substantially horizontal, and tilt direction support axes 11 are arranged on the cylinder body outer periphery side of photographic lens 3.

With this embodiment, support axes 11 are arranged on the part that is the center of gravity position in relation to all materials that are fixed to third frame 9, so it is easy to achieve weight balance in the tilt direction, and excess weight is not often placed on tilt direction support axes 11. Also, extra driving force is not required by tilt motor 12 to achieve weight balance in the tilt direction. In comparison to this, with the camera of comparative example 3, as shown in FIG. 8 (C), when third frame 9 is in a vertical stance, though it keeps the same-balance as that of this embodiment, for example, when at steps 108 to 114, pan driving is done by the tilt direction lower edge from initial position $S_D$ to pan direction end position $S_E$, as shown in FIG. 8 (D), tilt motor 12 requires extra driving force to achieve weight balance in the tilt direction. Therefore, there is an increase in the power consumption of the camera of comparative example 3. Also, because a large amount of driving force is required, this leads to a larger size tilt motor 12 and higher costs.

As described above, camera 1 of this embodiment has a large distance R between the light emitting element 5 and light receiving element 6, so the ranging precision with the trigonometric method is high, and it is possible to increase the precision of the framing of the face of person P. Also, because the space required for pan tilt operation is small, it is possible to increase the space efficiency of camera 1 as well as to make the device smaller, while at the same time, extra driving force is not required for tilt motor 12 to achieve weight balance in the vertical direction, so it is possible to decrease the overall power consumption of camera 1.

Next, we will explain the effects of the framing routine, etc. on the camera of this embodiment.

With camera 1 of this embodiment, pan operation is performed at the tilt direction lower edge by pan motor 13 (steps 104 to 116), and the body axis position $P_C$ of person P can be searched for (steps 118 and 120) from signal changes by a ranging unit (light emitting element 5 and light receiving element 6) that can do ranging in one direction. Next, tilt operation is performed by tilt motor 12 to face upward from body axis position $P_C$ (tilt direction lower edge), and the top of the head $P_D$ of person P is searched for from the signal changes by the ranging unit (steps 124 to 132). Then, photographing direction D of photographic lens 3 is turned by tilt motor 12 to face the center of the face $P_E$ of person P which has been searched for, and the face center $P_E$ of person P is framed in angle of view $V_A$ (steps 134 to 138), and the face of person P is photographed by imaging element 4. Therefore, camera 1 of this embodiment can frame the face of person P using four operations, including (1) a forward rotation pan operation from initial position SD to pan direction end position $S_E$, (2) a reverse rotation pan operation from pan direction end position $S_E$ to body axis position $P_B$, (3) a forward rotation tilt operation from body axis position $P_B$ to top of the head $P_D$, and (4) a reverse rotation tilt operation from top of the head $P_D$ to face center $P_E$ of person P, so it is possible to obtain an image of the face of person P rapidly. Therefore, with camera 1 of this embodiment, it is possible to rapidly obtain an image of the face of still person P, so at the host unit, trimming processing of cutting out the face part of person P from the background, etc. as was required with the prior art is not necessary, so it is possible to shorten image processing time, and at the same time, it is not necessary to do high resolution conversion of imaging element 4 that occurs with trimming processing, so it is possible to use a camera that has a low pixel count and is low in cost.

Also, with this embodiment, when performing forward rotation pan operation from initial position $S_D$ to pan direction end position $S_E$, the rangeable distance of the ranging unit is set to be shorter than the distance to the floor (within approximately 5 m), so it is possible to frame the face of person P without having the ranging unit mistake the subject for the floor.

Next, we'll explain a second embodiment that further simplifies the framing routine that automatically frames a person's face. Note that the same code numbers are given to the same elements and same steps as this embodiment and that explanation of these will be omitted, with only different parts being explained.

Figure 9:
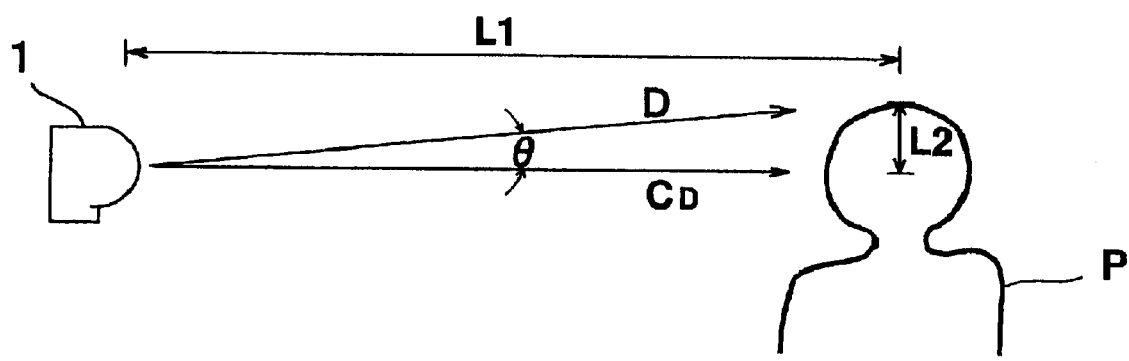
FIG. 9 is an explanatory diagram that shows a typical example of the angle relationship between the ranging unit and the photographic lens of the automatic framing camera of the second embodiment to which this invention can be applied.

As shown in FIG. 9, with the second embodiment, light emitting element 5, photographic lens 3, and light receiving element 6 are arranged in a substantially horizontal straight line, but the photographing direction $C_D$ of photographic lens 3 is set to be lowered by a specified angle $\square$ from ranging direction D of the ranging unit. This angle $\square$ is given as tan $\square$ =L2/L2 when L1 is the distance from the CCD surface of imaging element 4 to person P, and L2 is the distance from face center $P_E$ of person P to top of the head $P_D$ of person P (15 cm, for example). Note that as shown in FIG. 1, by making verification area 34 small (especially near the direction facing camera 1), the precision of this angle $\square$ increases, making it possible to increase the framing precision of the face of person P.

Figure 10:
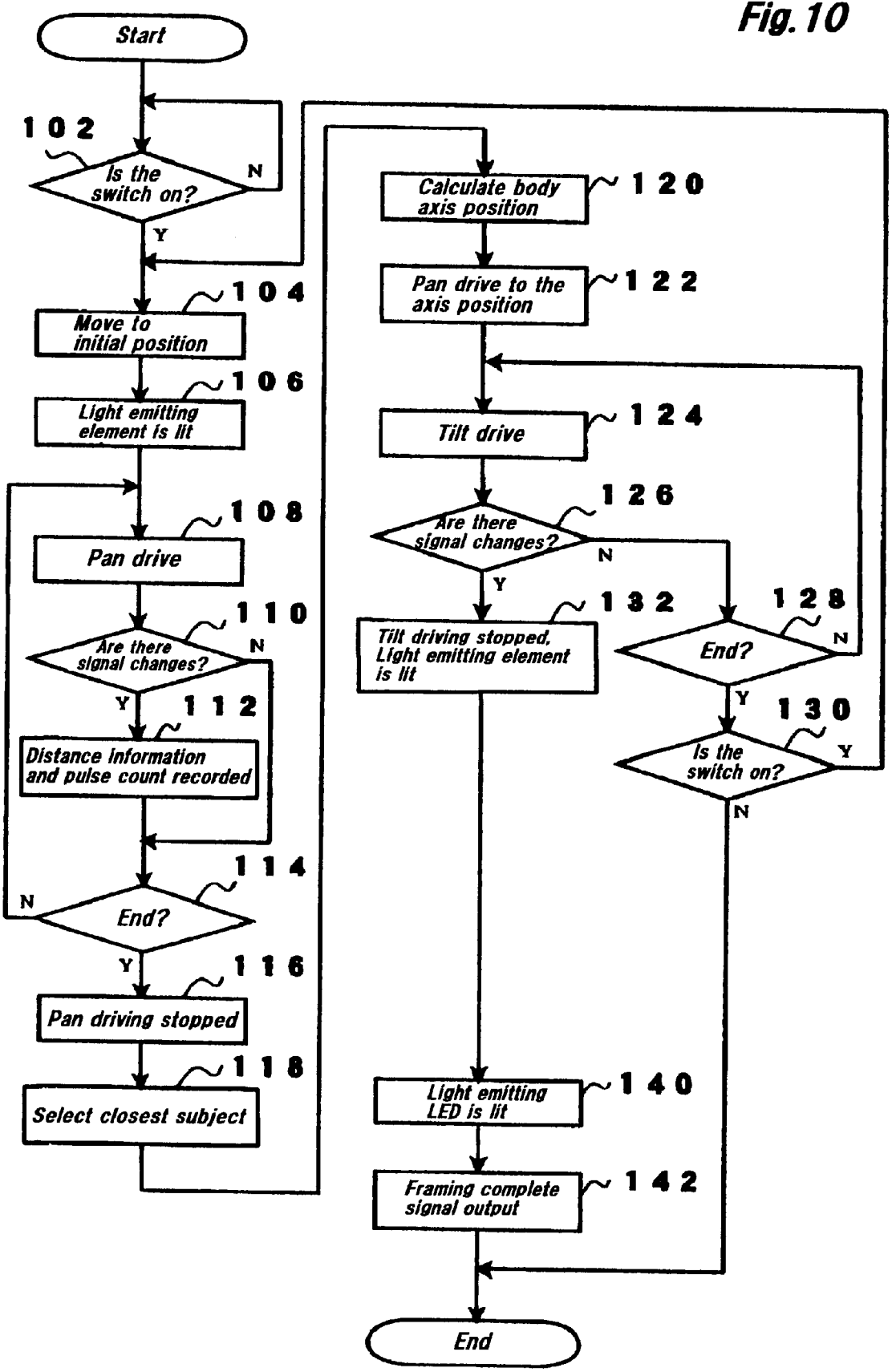
FIG. 10 is a flow chart of the framing routine executed by the microcomputer of the control circuit of the automatic framing camera of the second embodiment.
Figure 11:
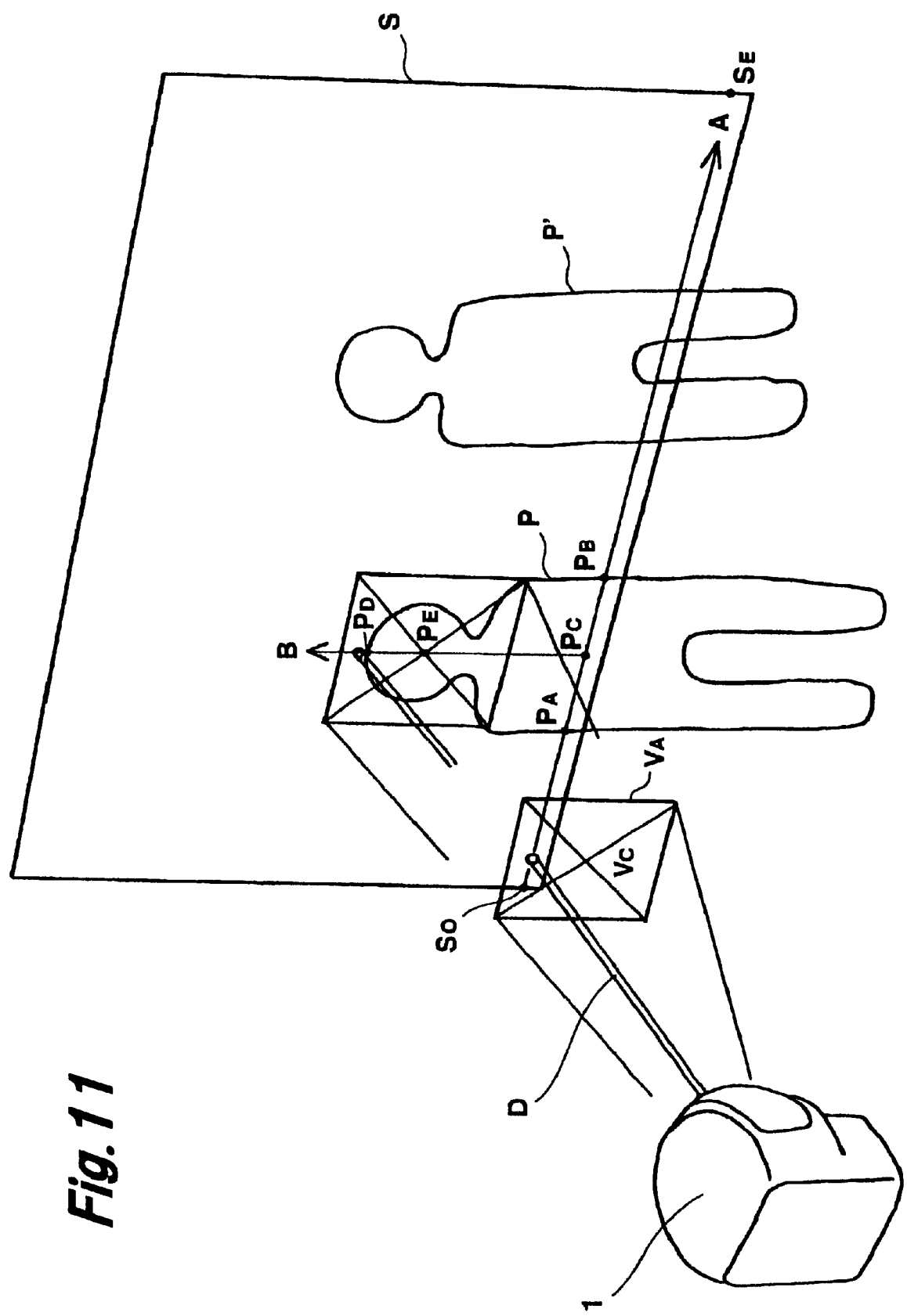
FIG. 11 is an explanatory diagram that shows a typical example of the ranging direction, photographing direction, and ranging tolerance of the automatic framing camera of the second embodiment.

As shown in FIG. 10, with the framing routine of camera 1 of the second embodiment, steps 132 to 136 shown in FIG. 5 are missing. Specifically, as shown in FIGS. 9 and 11, the photographic lens 3 photographing direction $C_D$ is set to be lowered from ranging direction D of the ranging unit by an amount angle $\square$ which is equivalent to the distance from the face center $P_E$ of person P to the top of the head $P_D$ of person P, so when signal changes are obtained for the top of the head $P_D$ of person P, if the driving of tilt motor 12 is stopped, it is possible for imaging element 4 at that position (direction) to capture face center $P_E$ of person P in the center of angle of view $V_A$.

With the camera of the second embodiment, because the processes of steps 132 to 136 are not necessary to capture the face of person P, specifically, if we explain this in relation to the first embodiment, because there is no reverse rotation tilt operation from top of the head $P_D$ to face center $P_E$ of person P as described in (4) above, it is possible to frame the face of a person even more rapidly than with camera 1 of the first embodiment.

Next, we will explain the non-detection area for the ranging means with this embodiment as well as the effect, etc. thereof.

Figure 12:
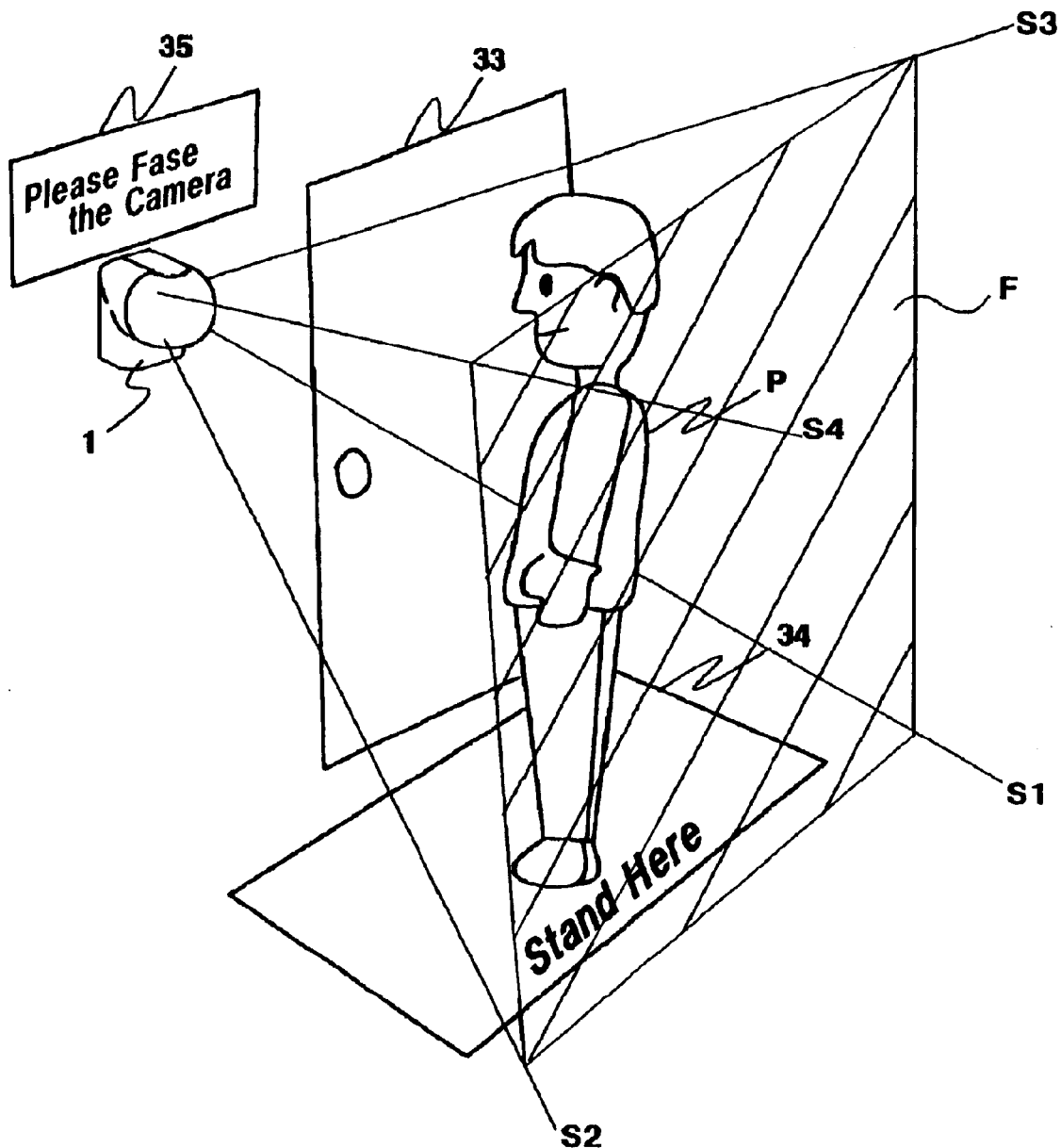
FIG. 12 is a perspective view for explaining the non-detection area of the ranging means of the automatic framing camera.

With this embodiment, in FIG. 12, the scope that can be ranged by camera 1 movement in the pan direction and movement in the tilt direction is the scope enclosed by S1 and S2 which are the left-right edge directions of the bottom edge and S3 and S4 which are the left-right edge directions of the top edge. At this time, by making the area farther than the distance F point a non-detection area, there will be no detection of objects, etc. farther away than person P which is the target subject, making it possible to do accurate framing quickly.

Figure 13:
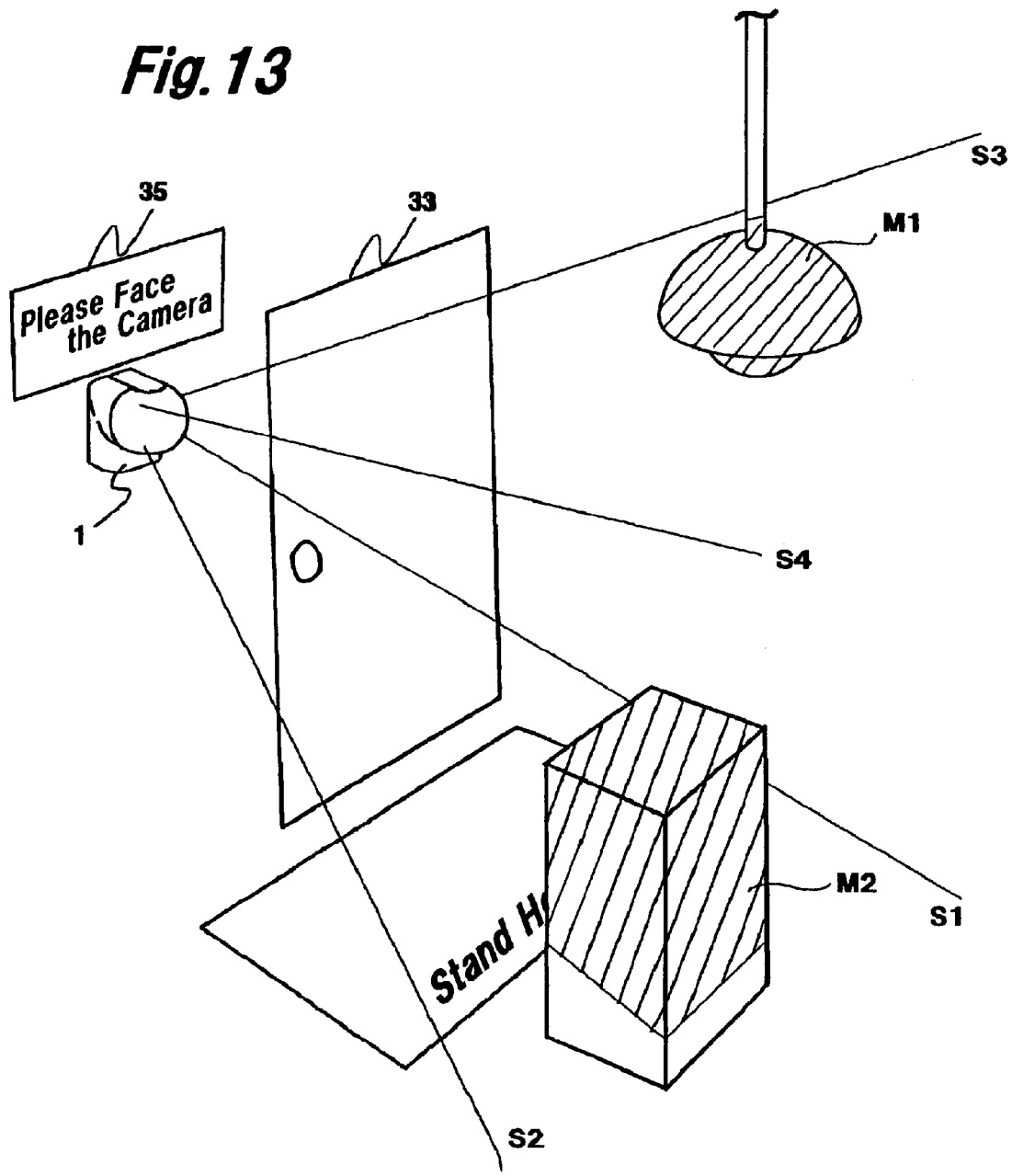
FIG. 13 is a perspective view for explaining setting of the non-detection area of the ranging means of the automatic framing camera.
Figure 14:
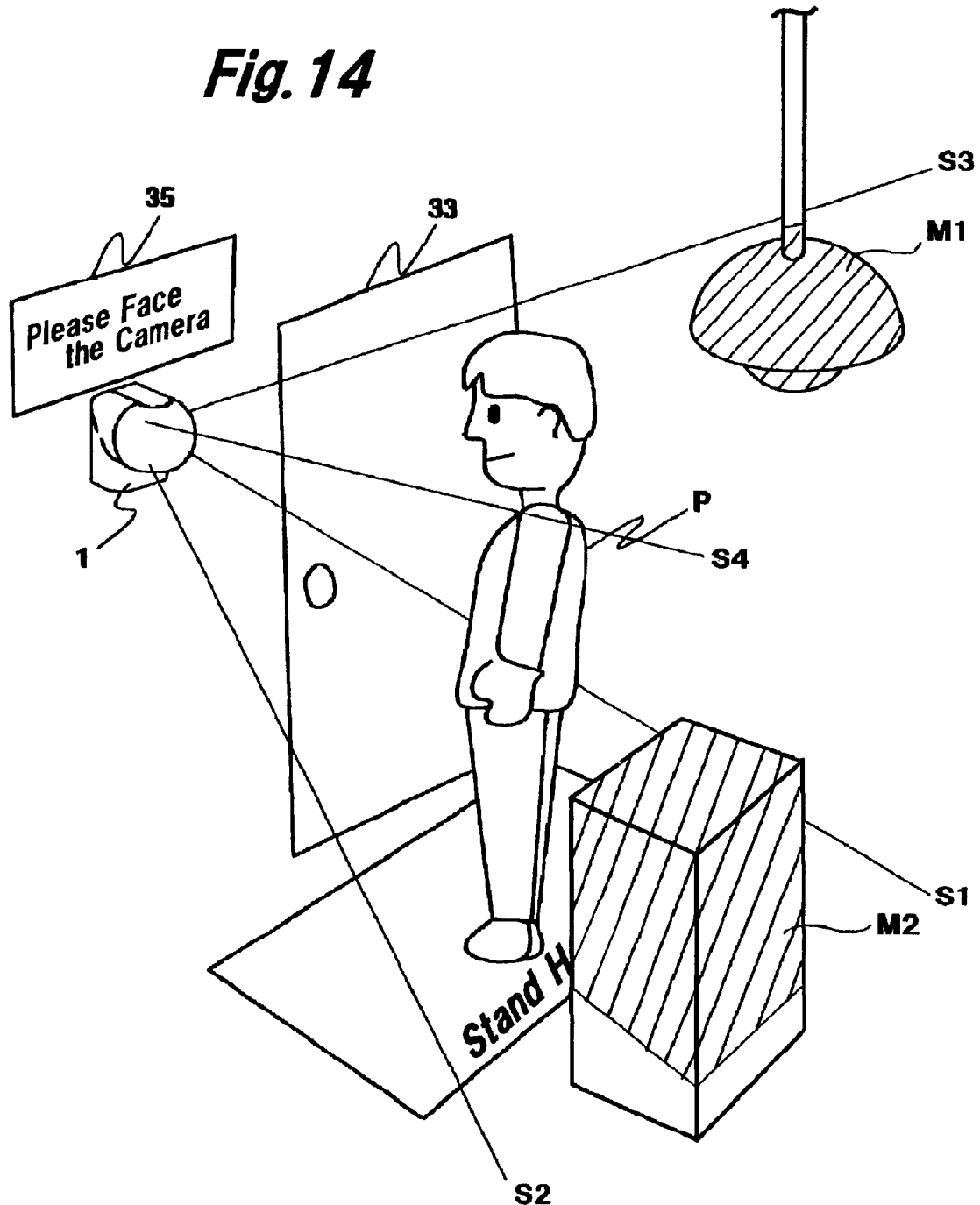
FIG. 14 is a perspective view for explaining detection of people by provision of a non-detection area for the ranging means of the automatic framing camera.

Also, as shown in FIG. 13, in the scope enclosed by S1, S2, S3, and S4, which is the scope for which ranging is possible, when there is no target subject person, the distance information for all directions are obtained in advance, the light M1 and box M2 directions and distance are stored in memory, and as shown in FIG. 14, when the target subject person arrives, by setting light M1 and box M2 as non-detection items, there will be no detection of objects, etc.

installed in advance other than person P, making it possible to do accurate framing quickly.

Note that with this embodiment, we showed an example of framing a person's face and photographing it, but the present invention is not limited to this, and it goes without saying that the present invention can also be used for cameras that frame specific parts of objects and photograph these. In such a case, locations can be set that correlate to one side, the other side, and the top of the head depending on the shape of the object to be photographed.

Also, with this embodiment, we showed an example of a continuous projection type light emitting LED 14, but it is also possible to use a flash type light emitting LED. By doing this, it is possible to obtain a clear image of the face of person P even if camera 1 is placed in a completely dark location.

Furthermore, with this embodiment, we showed an example of use in a dark place with the IR cut filter removed from photographic lens 3, but when camera 1 is placed in a location that is always light, by inserting an IR cut filter in photographic lens 3, among the light beams that enter imaging element 4, it is possible to remove light beams in the infrared range that are unnecessary, so that an image that is familiar to the human eye can be obtained.

Also, with this embodiment, we showed an example for which a control circuit 20 was provided on the camera 1 side, but this kind of control circuit 20 can achieve the same function using software even outside camera 1 or on the host unit side (not illustrated) described previously. This kind of mode will work as long as a control interface that connects the host unit side and camera side is secured, or a wireless link as represented by BLUETOOTH is secured.

Also, with this embodiment, we showed an example of tilt driving tilt motor 12 from body axis position $P_C$ to the arrow B direction (upward) of FIG. 6 to turn the angle of view $V_A$ of camera 1 toward the face of person P, but it is also possible to tilt drive tilt motor 12 from body axis tilt direction end position $S_C$ which is the top edge of body axis position $P_C$ of ranging tolerance S to the side opposite the arrow B direction (downward) to capture the signal changes of top of the head $P_D$.

As described above, with the present invention, the ranging direction is changed by a direction changing means, a still subject is identified from changes in ranging information by the ranging means, the photographing direction of the photographing means is turned toward the subject by the direction changing means, and the subject is photographed, so while it is possible to obtain an image of the still subject, the subject is framed in the obtained image, so there is no need for image processing such as cutting the image, etc. for framing, making it possible to obtain the effects of higher speed and lower cost.

What is claimed is:

1. An automatic framing camera comprising a photographing means for photographing a subject, a ranging means for measuring the distance in one direction, and a direction changing means for changing as a single unit the photographing direction of said photographing means and the ranging direction of said ranging means, wherein distance information corresponding to said ranging direction that is changed by said direction changing means is fetched in sequence, a subject is identified from changes in said distance information, and said photographing direction is turned toward said identified subject by said direction changing means, and a photograph is taken.

2. The automatic framing camera of claim 1 wherein for said subject identification, identification is done on the closest subject according to changes in said distance information.

3. The automatic framing camera of claim 1 wherein said photographing means can take photographs even in infrared light areas.

4. The automatic framing camera of claim 1 wherein said ranging means has an infrared light spot light emitting element and light receiving element.

5. The automatic framing camera of claim 4 wherein said light emitting element and said light receiving element are placed on both sides of said photographing means, respectively, and these are arranged in a straight line including said photographing means.

6. The automatic framing camera of claim 5 wherein said light emitting element, said light receiving element, and said photographing means are arranged side by side in a substantially horizontal direction.

7. The automatic framing camera of claim 6 wherein a rotation axis, on which are supported as a single unit with the ability to rotate said light emitting element, said light receiving element, and said photographing means, is provided extending into the cylinder body of said light emitting element and said light receiving element.

8. The automatic framing camera of claim 7 wherein said light emitting element, said light receiving element, and said photographing means are fixed on the same substrate, and said rotation axis is positioned in the perpendicular direction and depth direction in the center of gravity position of said substrate.

9. The automatic framing camera of claim 1 wherein said photographing means has the goal of photographing a person's face, said direction changing means can change the pan direction and tilt direction within a specified range, pan operation is performed at the lower edge within said specified range, the axis direction of the body of said person is identified from changes in the distance information by said ranging means, tilt operation is performed from the lower edge or the upper edge within said specified range at the axis direction of the body of said person, the direction of the top of the head of said person is identified from changes in the distance information by said ranging means, and by lowering said photographing direction by an amount of a preset angle from said identified top of the head direction, the direction that is the approximate center of the face of said person becomes said photographing direction.

10. The automatic framing camera of claim 9 wherein when said direction changing means performs pan operation at the tilt direction lower edge, the rangeable distance of said ranging means is shorter than the distance to the floor.

11. The automatic framing camera of claim 1 wherein said photographing means has the goal of photographing a person's face, said direction changing means can change the pan direction and tilt direction within a specified range, pan operation is performed at the lower edge within said specified range, the axis direction of the body of said person is identified from changes in the distance information by said ranging means, tilt operation is performed from the lower edge or the upper edge within said specified range at the axis direction of the body of said person, the direction of the top of the head of said person is identified from changes in the distance information by said ranging means, said photographing direction is set to be lowered by a specified angle in relation to said ranging direction, and when the top of the head of said person is identified, the approximate center of said person's face becomes said photographing direction.

12. The automatic framing camera of claim 11 wherein when said direction changing means does a pan operation at the tilt direction lower edge, the rangeable distance of said ranging means is shorter than the distance to the floor.

13. The automatic framing camera of claim 11 wherein said specified angle is given by $\tan^{-1}$ (L2/L1) when the distance between said photographing means and said person is L1 and when the distance from the approximate center of the face of said person to the top of the head of said person is L2.

14. The automatic framing camera of claim 1 wherein for said ranging means, greater than a specified distance is set as a non-detection area.

15. The automatic framing camera of claim 14 wherein said specified distance differs according to said ranging direction.

16. The automatic framing camera of claim 14 wherein for said specified distance, distance information that corresponds to the direction for which said ranging direction was changed by said direction changing means is obtained sequentially and stored in memory.

* * * * *